No. 847,573. PATENTED MAR. 19, 1907.
B. M. W. HANSON.
CHUCK.
APPLICATION FILED MAY 22, 1905.
2 SHEETS—SHEET 2.
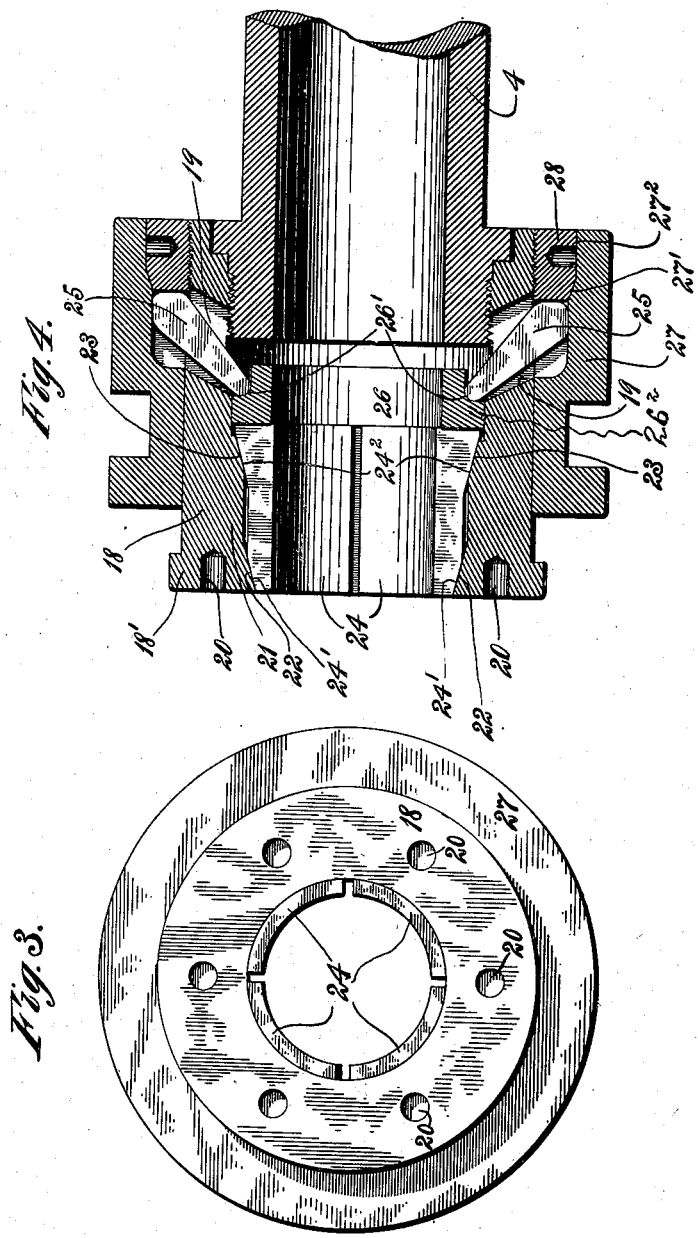
Witnesses:
S. S. Grotta.
F. E. Anderson.
Inventor:
B. M. W. Hanson,
By his Attorney,

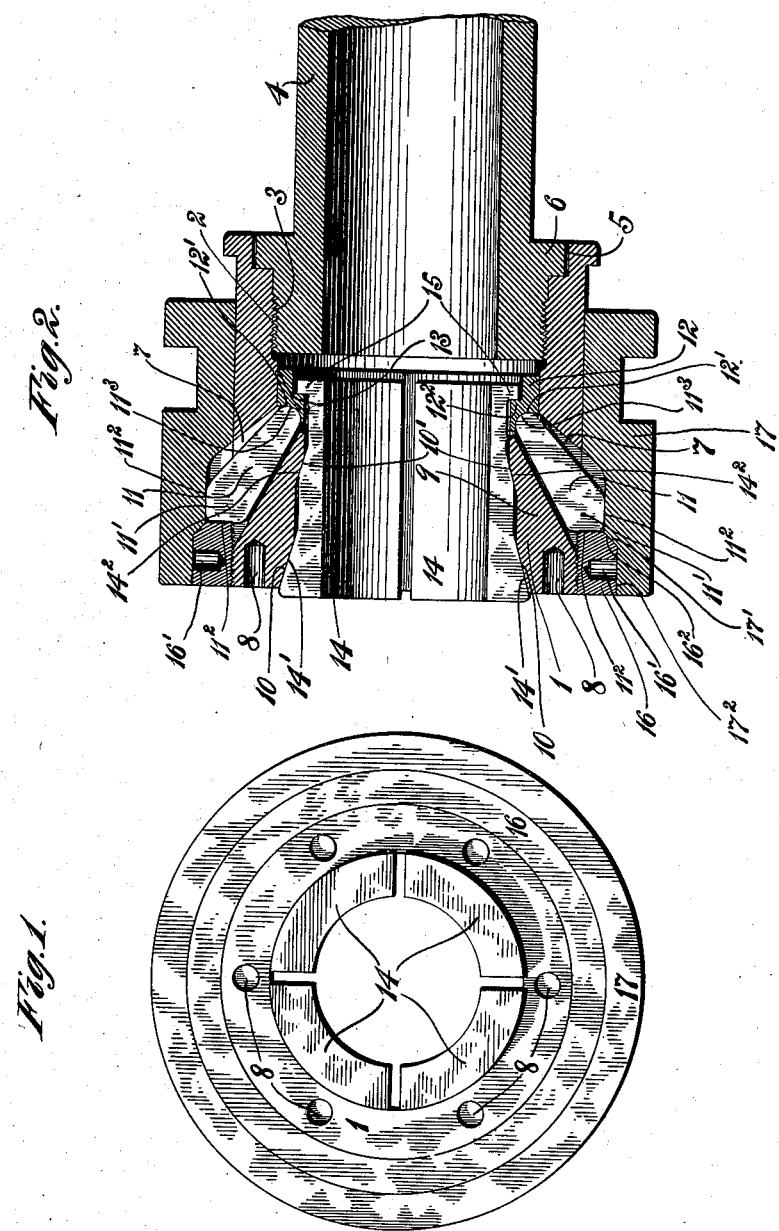

UNITED STATES PATENT OFFICE.

BENGT M. W. HANSON, OF HARTFORD, CONNECTICUT, ASSIGNOR TO PRATT & WHITNEY COMPANY, OF HARTFORD, CONNECTICUT, A CORPORATION OF NEW JERSEY.

CHUCK.

No. 847,573.        Specification of Letters Patent.        Patented March 19, 1907.

Application filed May 22, 1905. Serial No. 261,669.

*To all whom it may concern:*

Be it known that I, BENGT M. W. HANSON, a citizen of Sweden, (who has declared his intention of becoming a citizen of the United States,) residing at Hartford, in the county of Hartford and State of Connecticut, have invented certain new and useful Improvements in Chucks, of which the following is a specification.

This invention relates to chucks, and has for its object the provision of an improved chuck composed of but few parts and which will be of simple and compact construction and of reliable operation.

A further object of the invention is the provision in a chuck having a chambered body of peculiar devices for actuating the jaws thereof, said devices including a ring located in the chamber and bearing against said jaws, toggle levers or struts in engagement with the ring, and means for actuating said toggle levers or struts to cause the ring to close said jaws.

A further object of the invention is the provision of a chuck-body of peculiar internal construction and of jaws and a jaw-actuator within the body, as will be hereinafter described.

In the accompanying drawings, Figure 1 is an end view of a chuck constructed in accordance with one form of the invention, and Fig. 2 is a longitudinal vertical section of said chuck. Fig. 3 is an end view of another form of chuck, and Fig. 4 is a longitudinal vertical section of said chuck.

Like numerals designate similar parts throughout the several views.

Referring to the drawings, the numeral 1 designates a chuck body or head internally threaded at 2 to engage an external thread 3 on a spindle 4 and rabbeted at 5 to receive a circumferential stop-flange 6 of said spindle. In the chuck-body 1 are inclined slots 7, and in the end of said body are recesses 8 for the reception of a spanner by means of which the chuck may be attached to or removed from the spindle 4. Forward of its median line the chuck-body is reinforced or thickened at 9, and the inner circumferential wall of this reinforced portion is inclined at its outer end at 10 and adjacent to its inner end at 10' for a purpose hereinafter stated.

Designated each by the numeral 11 are wedge-shaped toggle levers or struts, each having heads 11', provided with right-angular bearing-surfaces $11^2$. At their lower ends each toggle lever or strut is provided with a rounded or convex surface $11^3$, which fit in a concave groove 12' of a jaw-actuating ring 12, said ring having a circumferential flange $12^2$ and being of substantially Z shape in cross-section to afford a flat bearing on its periphery to engage a cylindrical surface 13 on the inner side of the chuck-body.

Independent chuck-jaws 14 are shown in Fig. 2, and each is provided with a downward incline 14' at its forward end, coöperating with the incline 10 of the chuck-body, and with an incline $14^2$, coöperating with the incline 10' of said chuck-body. At their inner extremities each chuck-jaw is provided with a circumferential flange 15 in engagement with the shoulder or flange $12^2$ of the ring 12.

Threaded on the outer end of the chuck-body is a collar 16, having spanner-recesses 16', said collar being provided with an incline $16^2$, which engages an incline 17' of a sliding sleeve 17, surrounding the chuck-body said sleeve having a straight inner surface $17^2$ at its forward end conforming to the straight part of the periphery of the collar 16. In the operation of this form of the invention when the sleeve 17 is slid forward the incline 17' thereof will engage the inclined ends of the toggle levers or struts and will tend to straighten said toggles, or, in other words, cause them to approach a straight line, and this action will force the ring 12 on cylindrical surface 13 to the rear, and the flange $12^2$ of said ring in engagement with the flanges 15 of the chuck-jaws will pull said jaws within the chuck-body and cause them to engage the inclines on the inner wall thereof and be forcibly compressed upon the stock. A reverse movement of the sleeve 17 will release the parts and permit the chuck to open. By reinforcing the inner wall of the chuck-body at the point described strength is provided where most needed to resist the strain.

In the form of the invention shown in Figs. 3 and 4 a chuck body or head 18, having a flange 18', slots 19 adjacent to its rear end, and holes 20 in its front end for the reception of a spanner, is represented. Like the other form this body is reinforced at 21 to resist strain, and the reinforced part has inclines 22 and 23; but these inclines are reversely located with respect to those shown in Fig. 2, so that the chuck-jaws 24, having inclines 24' and 24², are closed by forcing them forward into the chuck-body instead of pulling them therein, is in the other construction. Toggles 25, like the toggles 11, are seated at one end in a groove 26' of a ring 26, bearing against the inner ends of the jaws 24 and confined by a cylindrical surface 26² of the head. A sliding sleeve 27, inclined on its inner side at 27' and straight at 27² to engage a ring 28, threaded to the rear end of the chuck-body, actuates the toggles, and the action of this form of chuck is the reverse of that of the other form—i. e., in the chuck illustrated in Figs. 1 and 2 the jaws are pulled rearward into the chuck-body, while in Figs. 3 and 4 they are forced forward into said chuck-body.

In prior constructions known to me the chuck has been operated by a long sleeve inserted in the bore of the spindle, by which said chuck is carried. This sleeve takes up considerable valuable space, and therefore limits the capacity of the spindle to receive stock of a diameter approximating the bore thereof. In both forms of the invention shown I have obviated this difficulty by the provision within the chamber of a chuck-body of a comparatively narrow ring adapted to engage the chuck-jaws and to force them when actuated by the means described or other means upon the stock. By the provision of this ring in either of the forms shown, said ring having a bore of sufficient diameter to receive stock of the sizes to enter the tubular spindle, defects of the old construction are eliminated, and the action of the toggles against the ring serves to close the chuck-jaws firmly upon the material to be held by them.

Changes may be made in the various parts of the chuck, the invention not being limited to the exact devices shown and described.

Having thus described my invention, what I claim is—

1. The combination, with a spindle, of a chuck comprising a tubular head, chuck-jaws in the head; a ring loose within the head, bearing against the rear ends of the chuck-jaws, and having a bore of a diameter sufficient to receive stock passing through the spindle, means for actuating said ring; and means for closing the chuck-jaws when the ring is actuated.

2. A chuck comprising a slotted, tubular head having inclined and cylindrical surfaces on its inner wall, toggles mounted in the slots of the head, a sleeve movable on the head, and serving to actuate said toggles, a ring loose within the head, and engaged by the inner ends of the toggles, said ring being guided by the cylindrical part of the inner wall of the head, and chuck-jaws having inclines in engagement with the inclined part of said inner wall of the head, the rear ends of said chuck-jaws bearing against said ring.

3. The combination, with a spindle, of a tubular head having peripheral slots, and provided with inclined and cylindrical inner surfaces; chuck-jaws in said head; toggle-levers passing through said peripheral slots, and having inclined surfaces; a ring loose within the head beyond the spindle, said ring fitting the cylindrical inner surface of the head, and engaging the rear ends of the chuck-jaws, and being actuated by said toggle-levers; and a sleeve movable on the head, and having an inclined surface for operating the toggle-levers.

4. The combination, with a spindle, of a tubular head in engagement with the end of said spindle, said head having a series of slots; a grooved ring loose within the head beyond the end of the spindle; chuck-jaws bearing at their rear ends against said ring; toggle-levers extending through said slots, and seated at one end in the groove of the ring; an adjustable abutment for the heads of the toggle-levers; and means for actuating said toggle-levers, and thereby moving the ring.

5. The combination, with a spindle, of a tubular head having a series of slots and an inclined inner surface; toggles mounted in the slots, and having inclined outer ends; a grooved ring loosely mounted in the head, and with which the inner and rear ends of said toggles are in engagement; a sleeve slidable on the head, said sleeve having inclined and cylindrical inner surfaces engaging the toggles; and chuck-jaws in position within the head to be engaged at their rear ends by said ring.

6. The combination, with a tubular head having a series of inclined slots, and also having an inclined inner surface, of toggle-levers located in said slots, and having angular upper and rounded lower extremities; a movable ring located in the head, and having a groove in which the lower extremities of said toggle-levers are seated; a sleeve slidable on the chuck-body, and having an inclined surface for actuating the toggle-levers; an abutment for the heads of said toggle-levers; and chuck-jaws bearing at their rear ends directly against said ring.

7. A chuck comprising a tubular and slotted head, said head having inclined and cylindrical surfaces on its inner wall; toggles mounted in the head; a ring fitting the cylindrical inner surface of the head, and with which the rear and inner ends of said toggles are in engagement; chuck-jaws within the head, having inclined peripheries, and in position to be engaged by said ring and by the inner surface of the head; and a sleeve slidable on the head, said sleeve having an inner surface shaped to engage and actuate the toggles.

In testimony whereof I affix my signature in presence of two witnesses.

BENGT M. W. HANSON.

Witnesses:
KATH. T. M. O'CONNELL,
HENRY L. HUNTINGTON.